United States Patent [19]

Doeksen

[11] 4,169,170

[45] Sep. 25, 1979

[54] CONTROL OF DUST DURING COAL TRANSPORTATION

[75] Inventor: Gerard Doeksen, Montrose, Canada

[73] Assignee: Cominco Ltd., Vancouver, Canada

[21] Appl. No.: 765,033

[22] Filed: Feb. 2, 1977

Related U.S. Application Data

[63] Continuation-in-part of Ser. No. 559,102, Mar. 17, 1975, abandoned.

[30] Foreign Application Priority Data

Mar. 29, 1974 [CA] Canada ................................. 196405

[51] Int. Cl.$^2$ ............................................ B65B 33/00
[52] U.S. Cl. .................................... 427/155; 427/154; 106/277; 44/6; 414/133; 414/786
[58] Field of Search ...................... 44/6; 427/212, 214, 427/154, 155; 106/277; 214/10

[56] References Cited

U.S. PATENT DOCUMENTS

| | | | |
|---|---|---|---|
| 1,988,999 | 1/1935 | Cunningham | 44/6 |
| 2,346,650 | 4/1944 | Borenstein | 44/6 |
| 2,378,235 | 6/1945 | Miles | 44/6 |
| 2,431,891 | 12/1947 | Rosencranse | 44/6 |
| 2,448,605 | 9/1948 | Kleinicke | 44/6 |
| 3,069,293 | 12/1962 | Booth | 44/6 |
| 3,563,714 | 2/1971 | Brewer | 44/6 |
| 3,808,020 | 4/1972 | Pitchford | 106/277 |

*Primary Examiner*—Sam Silverberg
*Attorney, Agent, or Firm*—Arne I. Fors

[57] ABSTRACT

Spraying of coal in an open top hopper car with an aqueous composition containing at least about 2.5% of a binder material consisting of solid material in an aqueous suspension of an asphalt emulsion or a black liquor lignin product and containing 0.1 to 2.0% of water soluble ethoxylated alkyl phenol or sulfo succinate wetting agent results in the formation of a crust layer which provides protection against loss of coal due to wind action during rapid movement of the car.

5 Claims, No Drawings

CONTROL OF DUST DURING COAL TRANSPORTATION

This application is a continuation-in-part of application Ser. No. 559,102 filed Mar. 17, 1975, now abandoned.

BACKGROUND OF THE INVENTION

This invention relates to treatment of coal in open top hopper cars with asphalt emulsions and pulp mill black liquor compositions to reduce losses in transit due to the action of wind on the coal surface.

When coal is being transported in open top gondola cars in unit trains under drying weather conditions, wind action due to rapid movement of the train tends to blow dust off the surface unless some means of retarding this action is provided. Settling of coal dust near the railway tracks, particularly in populated areas, is objectionable. As much as 45% of the coal that is handled in this way may be finer than 28 mesh.

It has been proposed that the open top gondola cars be provided with covers to protect the coal against wind action. Use of fibreglass lids on cars carrying metal concentrates is known. Such lids add substantially to the tare weight of each shipment and their removal before dumping and filling of the cars requires much labour or elaborate mechanical equipment. For coal, the cost of covering is very high in relation to the value of the product shipped.

Laying of dust by treatment of coal by oils and binders is known.

U.S. Pat. No. 1,988,999 discloses a process for rendering bituminous coal permanently dustless by treatment with ⅜ to 2 gallons per ton of a composition comprising petroleum oil, water and a by-product separated from alkaline black liquor formed in the operation of sulphate or soda pulp mills. This by-product promotes wetting and penetration of the coal by the oil. The composition may be applied by sprinkling. Lignin liquors and lignosulphonic acids, which are water soluble, are specifically excluded from the operative by-products.

U.S. Pat. No. 2,431,891, which relates to a method for preparing an aqueous colloidal suspension of asphalt in water, discloses use of the suspension for spray coating of coal to render it substantially dust proof. The asphalt component is oxidized to reduce its penetration whereby discrete coal particles are coated without producing tackiness to avoid the particles undesirably sticking together.

U.S. Pat. No. 2,854,347 discloses a process for protecting fine coal in rail cars against windage losses by spraying with an aqueous emulsion of an elastomeric substance such as latex to form a thin resilient film which is intended to keep the surface intact. When the surfaces of the coal particles are dry, increasing the quantity of elastomer can be avoided by pre-wetting the surfaces with water or solutions of suitable wetting agents. Subsequent U.S. Pat. No. 3,069,293 uses an emulsion of an alkyd resin to form a protective coating on individual pieces of coal which prevents spalling. Better coatings are formed if the coal surfaces are wetted with water or with one of a variety of wetting agents such as sodium dioctylsulfosuccinate.

A method of minimizing in-transit windage losses of coal from rail cars is described by G. H. Denton et al. in Mining Congress Journal, Volume 58, September, 1972, pages 49 to 53. In this process, a latex-in-water formulation is sprayed onto the surface of coal in a car in sufficient quantity to penetrate the coal surface to a depth of 1.5 to 2.5 inches and then dry to consolidate a top layer of the coal into a flexible crust which is wind resistant. One gallon of latex concentrate in 24 gallons of water is recommended. More dilute solutions do not wet the coal satisfactorily and more concentrated solutions tend to form a strong, rubbery sheet over the surface of the coal which tends to blow off on being ruptured.

SUMMARY OF THE INVENTION

I have discovered that spraying of the surface of coal in hopper cars with asphalt-water emulsion compositions containing, by weight, about 2.5 to 15% solids and 0.1 to 2.0% wetting agent of the group of water soluble ethoxylated alkyl phenols and sulpho succinates results in formation of a crust layer which provides better protection than heretofore obtained by the prior art coatings. This composition with the increased quantity of a water soluble wetting agent permitted application of a quantity of about 50 Imperial gallons per hopper car on 500 square feet of coal surface which penetrated to a depth of 2.5 to 3 inches to form, on drying, an asphalt treated layer which was more cohesive and which, on breaking, exposed less underlying untreated coal than a layer similarly treated with latex.

An important factor in the breaking of a crust on the surface of the coal is the twisting action of the car in motion. This imposes shear stresses on the crust layer. I have observed that, with crusts formed by latex treatments as hereinafter described, crust breakdown proceeded in a sequence of steps. First, generally diagonal cracks formed in the crust. As these diagonal cracks intersected, the crust separated into blocks which were roughly diamond shaped. Continued twisting action of the car caused the edges of these blocks to rub together and erode to release coal fines. As erosion proceeded, spaces between blocks opened up, exposing increasing quantities of untreated, underlying coal. As crust breakdown progressed through these steps, protection against wind loss progressively decreased. Initially effective protection became inadequate during the latter part of a 700 mile trip. I have also observed that, with crusts formed by the asphalt emulsion treatment of the present invention under the same test conditions, crust breakdown did not progress beyond the initial formation of diagonal cracks. Factors contributing to the superiority of this treatment are deeper penetration of the asphalt emulsion-wetting agent compositions as hereinafter defined, greater adhesiveness of the asphalt binder, greater flexibility of the asphalt treated crust and less friability of blocks of asphalt treated crust. I observed similar properties in coal treated with lignin products in the form of black liquor or neutralized black liquor containing the prescribed wetting agents.

It is the principal object of the present invention to provide improved binding of a surface layer of coal in a hopper car in order to decrease losses due to wind action during transportation.

It is also an object of the invention to provide a composition which quickly wets and penetrates into a surface layer of coal to deposit a binding material to form with the surface coal a flexible, wind-resistant crust.

It is a further object of the present invention to provide a binding material which itself has recoverable fuel value.

DESCRIPTION OF PREFERRED EMBODIMENTS

With these objects in mind, treatments were carried out in a test program in which asphalt and lignin products derived from black liquor were used as binder materials.

Since, in unit train shipment, coal in about 90 cars requires treatment and since time is an important economic factor in this method of handling, it is necessary that treatment compositions penetrate the coal mass before flowing off the usually arched surface. Limited spraying time is imposed by the speed with which the hopper car is moved under a sprayer, e.g., spraying of a 50-foot car by a sprayer extending across the width of the car must be completed in about 1 minute if the train is moving at 0.5 mile per hour. Even at 0.2 mile per hour, a speed at which uniform train movement and hence uniform coverage is difficult, wetting of a 1 foot long segment of coal would be completed in about 3 seconds. Preliminary tests with a number of potential binder materials show that an effective wetting agent is required and the following test was used to aid in selection. Solutions containing 0.01 to 5% wetting agent in 200 g. water were prepared in beakers and 2 g. minus 100 mesh dry coal were added to each. The coal floated until it was wetted and then sank to the bottom of the beaker. This time was noted in each test. All tests were carried out at 66° F. In the following tabulation, it will be noted that the time for a coal sample to be wetted varies with the wetting agent chosen and the quantity of wetting agent used.

Table 1

| | TIME (Seconds) Required to Wet 2.0 Grams of Coal % Wetting Agent | | | | | | |
|---|---|---|---|---|---|---|---|
| | 0.1 | 0.2 | 0.4 | 0.5 | 0.6 | 0.8 | 1.0 |
| AEROSOL GPG | 38 | 21.5 | 7.08 | 6.4 | 6.5 | 5.8 | 5.8 |
| TERGITOL TMN | 41 | 19 | 8.5 | 8.0 | 7.5 | | 6.0 |
| TERGITOL NPX | 47.5 | 39 | 22.5 | 19.0 | 12.0 | | |
| TRITON GR5 | 26 | 23.8 | 9.4 | 8.9 | 7.9 | 7.7 | |
| TRITON GR7 | 44 | 33.6 | 14.3 | 13.2 | 10.6 | 8.4 | |
| TRITON X100 | 72 | 40 | 20 | 17 | 15 | 12 | 10.5 |
| DIANOL F50 | 43 | 35 | 17.0 | 14.5 | 11.5 | 7.5 | 7.0 |
| DOWELL F600 | 62.3 | 34 | 22.6 | 21.6 | 14 | 11.5 | 9.6 |
| STEROX SK | 75 | 48 | 30 | 25.5 | 22 | 15.5 | 13 |
| AEROSOL OS | 720 | | | 164 | | | 46 |
| REXOL 25/4 | | | | 1080 | | | 600 |
| REXOL 25/6 | 383 | | | 135 | | | 161 |
| REXOL 25 JWC | 87 | 49.5 | 27 | 24 | 18 | 11.5 | 16 |
| REXOL 35/100 | 64 | 40 | 24.5 | 19 | 16.5 | 11.5 | 13 |
| REXOL 36A | 136 | 25.5 | 32.5 | 28 | 29 | 21.5 | 18 |

Observations not tabulated include wetting times of 146 and 147 seconds for 0.3% and 0.7% respectively of REXOL 25/6 and wetting times of 600 and 97 seconds for 0.3 and 0.7% AEROSOL OS.

The wetting agents identified by the foregoing trade marks are as follows. AEROSOL GPG, manufactured by American Cyanamid Company, is the trade mark for the wetting agent dioctyl ester sodium sulfo succinic acid while the TRITON GR5 and GR7 compounds manufactured by Rohm and Haas Company are dioctyl sulfo succinates, all anionic sulfo succinates as classified in McCutcheon's "Detergents and Emulsion", 1968. The TERGITOL TMN compound manufactured by Union Carbide Company is trimethyl nonyl polyethylene glycol ether; the TERGITOL NPX compound also manufactured by Union Carbide Company is nonyl phenol polyethylene glycol ether; the DIANOL F50 compound manufactured by Quaker Chemical Company is modified ethylene oxide; the DOWELL F600 compound manufactured by Dow Chemical Company is alkyl phenol ether of polyethylene glycol; the TRITON X100 compound manufactured by Rohm and Haas Company is ethoxylated alkyl phenol; and the STEROX SK compound manufactured by Monsanto Chemical Company is ethoxylated alkyl phenol. These compounds are classified as ethyoxylated alkyl phenols, and all are water soluble.

AEROSOL OS, an American Cyanamid Company product, is sodium diisopropyl naphthalene sulfonate and has been included to represent a group of commonly used wetting agents which did not provide satisfactory wetting times.

The REXOL group is a series of ethoxylated alkyl phenols which, as listed, have progressively decreasing percentages of ethylene oxide accompanied by progressively decreasing oil solubility and progressively increasing water solubility. REXOL 25/4 (44% ethylene oxide) and REXOL 25/6 (54% ethylene oxide) were preferentially oil soluble with the former having poor water solubility and the latter being slightly soluble in water. Mid-range REXOL 25 JWC (68% ethylene oxide) and REXOL 35/100 (89.6% ethylene oxide) had good water solubility and were slightly soluble in oil. REXOL 36A (93.4% ethylene oxide) was highly water soluble but had poor oil solubility. The first three are nonyl phenol polyethoxy ethanols while the last two are tridecyl alcohol polyethoxy ethanols. They are all products of Hart Chemical Ltd., a Canadian Division of Lever Brothers. Oil soluble wetting agents which have low water solubility, e.g., the ethoxylated alkyl phenols having the asphalt wetting properties required in U.S. Pat. No. 3,808,020, are not suitable.

Increasing the concentration of AEROSOL GPG beyond 1.0 percent showed progressively increasing wetting times, e.g. 8.5, 15, 25, 50 and 90 seconds for 1.5%, 2.0%, 3.0%, 4.0% and 5.0% wetting agent respectively.

Similar tests were then carried out in which the following wetting agents were mixed with varying compositions of binder materials comprising asphalt emulsions and lignin products derived from pulp mill black liquor. Satisfactory asphalt emulsions are COLAS 82-500, a Shell Oil Company product, identified below as Asphalt Emulsion 1, and BITUMULS RS-1, a Standard Oil Company of British Columbia product identified below as Asphalt Emulsion 2. A satisfactory lignin product is an aqueous suspension of a lignin sulfonate obtained from black or spent liquor separated from pulp cooked by the soda or sulphate process. The composition identified below as Black Liquor 1 was obtained by adding water to 37 Bé sodium lignin sulfonate liquor. Water may also be added to dried solids in the form of sodium or ammonium lignin sulfonate obtained in the same pulp cooking process. Refinement of the black liquor to remove wood sugars, etc., is not required.

Table 2

| TIME (seconds) REQUIRED TO WET 2.0 GRAMS OF COAL | | | | | | | |
|---|---|---|---|---|---|---|---|
| | % Wetting Agent | | | | | | |
| Treatment | 0.1 | 0.2 | 0.4 | 0.6 | 0.8 | 1.0 | 1.2 |
| 10% Asphalt Emulsion 1 (5% Solids) | | | | | | | |
| AEROSOL GPG | 45 | 23 | 8.8 | 8.0 | | | |
| DOWELL F600 | 302 | 107 | 40 | 21 | | | |
| 10% Asphalt Emul- | | | | | | | |

Table 2-continued
TIME (seconds) REQUIRED TO WET 2.0 GRAMS OF COAL

| Treatment | % Wetting Agent | | | | | | |
|---|---|---|---|---|---|---|---|
| | 0.1 | 0.2 | 0.4 | 0.6 | 0.8 | 1.0 | 1.2 |
| sion 2 (5% Solids) | | | | | | | |
| AEROSOL GPG | 33 | 21 | 7.0 | 5.7 | | | |
| DOWELL F600 | 330 | 67 | 21.0 | 18.5 | | | |
| TERGITOL TMN 20% Asphalt Emulsion 2 (10% Solids) | 75 | 46 | 11 | 9 | 8 | 7 | 6 |
| TERGITOL TMN 30% Black Liquor 1 (15% Solids) | 100 | 55 | 16 | 15 | 14.5 | 13 | 11.5 |
| AEROSOL GPG Sodium Lignin Sulfonate (15% Solids) | 16 | | 14 | | | 25.5 | |
| AEROSOL GPG Ammonium Lignin Sulfonate (15% Solids) | 34 | | 14.5 | | | 12.5 | |
| AEROSOL GPG | 44 | | 16.5 | | | 16 | |

Undiluted asphalt emulsions 1 and 2 and undiluted black liquor 1 each contained about 50% solids. Hence, solid binding material was about half the percentage of undiluted asphalt emulsion or black liquor used. The lignin sulfonate compositions were prepared from dried black liquor products. Without added wetting agent, the asphalt emulsions and the black liquor compositions required more than 2 hours to wet 2 grams of coal as used in each test. A 20% asphalt emulsion required more wetting agent than a 10% asphalt emulsion. For comparative purposes, five latex-in-water compositions, all prepared by dilution of proprietary formulations containing about 50% solids, were tested as recommended by the manufacturers. Latex Formulation 1, used as a 5% solution containing 2.5% solids, wetted 2 grams of dry coal in 27 seconds. This formulation by Dow Chemical Company and identified as DOWELL M125, discussed hereinabove, is a mineral product binder comprising a blend of a latex-in-water emulsion, a surfactant and a chemical stabilizer which prevents damage upon freezing. Eight percent solutions of Latex Formulations 2 and 3 containing 4% solids wetted the coal in 1 hour. These are identified as Reichhold Chemicals Inc. products 5257/29 and 5257/30, respectively. Five percent solutions of Latex Formulations 4 and 5, Reichhold product 40-133 and American Cyanamid Company CYANO SPRAY 71 containing 2.5% and 1.5% solids, respectively, failed to wet the coal within 2 hours. Wetting agents, if present in these formulations, were not adequate to provide the rapid wetting times disclosed in Table 2.

The foregoing tests indicate that about 0.1 to about 2.0 percent of a water soluble dioctyl sulfo succinate or an ethoxylated alkyl phenol wetting agent is effective in promoting the wetting of coal by asphalt emulsion and black liquor compositions. Although it is important that the wetting agent is water soluble, some oil or asphalt solubility of the wetting agent improves emulsion stability and is therefore desirable. Also, the more commonly marketed intermediate range wetting agents are usually available at less cost.

Hopper car transport conditions were then simulated in a large number of tests in which a truck was equipped with an open box carrying trays which were heaped with coal and then sprayed with 50 gallons of test material per 500 square feet of surface, except as noted below. The truck was then moved about at speeds between 50 and 60 miles per hour to provide both violent vibration and an effective air stream across the surface of the coal. The surface of coal treated with Latex Formulation 1 (30 gallons 5% solution per 500 square feet of surface as recommended by the manufacturer) withstood this handling for 80 miles, then failed. This was the best of several proprietary compositions which were used as recommended. Crust on coal obtained by treatment with Latex Formulation 2 plus 0.1% sulfo succinate wetting agent (30 gallons per 500 square feet of solution containing 4% solids) failed on travelling 20 miles. Increasing the wetting agent to 0.5% and quantity of solution to 50 gallons per 500 square feet increased the distance to failure to 160 miles. Like treatments with Latex Formulation 3 resulted in distances to failure of 5 and 135 miles, respectively, while the distances for Latex Formulation 5 were 50 miles and 135 miles respectively. None of the following treatments resulted in failure at a distance up to 210 miles.

10% Asphalt Emulsion 1 plus 0.5% AEROSOL GPG
20% Asphalt Emulsion 1 plus 0.5% AEROSOL GPG
10% Asphalt Emulsion 1 plus 0.5% DOWELL F600
10% Asphalt Emulsion 2 plus 0.5% AEROSOL GPG
10% Asphalt Emulsion 2 plus 0.5% DOWELL F600
15% Asphalt Emulsion 2 plus 0.25% AEROSOL GPG Based on the foregoing tests, the following compositions were selected for the treatment of coal being shipped by unit train from a mine in South Eastern British Columbia to Roberts Bank seaport, a distance of about 700 miles. Eight formulations, including urea solution, were tested. Coal treatments and test observations, including crust strengths at the end of the run and surface appearance during the last 100 miles, are tabulated.

Table 3
TREATMENT OF COAL IN RAIL CARS

| Binder | Wetting Agent | Crust Depth (inches) | Crust Strength | Last 100 Miles |
|---|---|---|---|---|
| Asphalt 2 5% | DOWELL F600 0.25% | 2.5 | Strong | Few cracks to 1/16" wide |
| Asphalt 2 10% | DOWELL F600 0.5% | 3 | Strong | Few cracks to 1/4" wide |
| Asphalt 2 15% | DOWELL F600 0.5% | 3 | Strong | Few cracks to 1/4" wide |
| Asphalt 2 30% | DOWELL F600 0.25% | 2.5 | Very Strong | Few cracks to 1/16" wide |
| Latex 1 5% | — | 1 | Very Weak | Severe breakup to 4" size pieces |
| Latex 4 4% | AEROSOL GPG 0.25% | 2 | Weak | Many cracks to 1" wide |
| Latex 2 4% | DOWELL F600 0.25% | 1 | Strong | Several cracks to 1/4" wide |
| Urea 10% | AEROSOL GPG 0.5% | 2 | Weak | Cracks to 1/2" wide |

Since the asphalt emulsion and latex formulations in Table 3 were derived from concentrates containing about 50% solids, percent solid binder material in each formulation is about half the tabulated percentage of concentrate, i.e., in the range 2.0 to 15 percent. Except for a manufacturer's recommended 30 gallons per 500 square feet for the treatment with Latex Formulation 1, all treatments were carried out with aqueous compositions containing 50 gallons of binder material per 500 square feet of coal surface. Treatments with aqueous dilutions containing 5 to 30% asphalt emulsion concentrate having about 50% solids and containing 0.1 to 2.0% wetting agent of the group water soluble ethoxylated alkyl phenols and sulfo succinates provided improved protection against wind loss of coal being transported in open top rail cars.

I have observed that it is advantageous to prepare asphalt emulsion and black liquor lignin product concentrates containing about 50% solids and up to 6% of a wetting agent consisting of the group sulfo succinates and ethoxylated alkyl phenols having water solubility by shear mixing of the wetting agent into a cold slurry. Although ordinary stirring dissolves the wetting agents readily in hot water and disperses them readily when concentrates are diluted with hot water, the heating does cause loss of wetting action. Ordinary stirring of cold mixtures is ineffective. Initially, a manufacturer provided compositions containing about 50% binder material to a coal shipper who diluted them with hot water and added the wetting agent. This guarded against possible deleterious effects of high concentration on the stability of the emulsion or on the effectiveness of the wetting agent. I have now observed that asphalt emulsion and lignin product concentrates containing 50% solids and up to 6% of one of these wetting agents may be stored several months before being diluted for application to the coal. Effective coal dust control treatment was obtained by spraying with a dilution of concentrate containing 50% solids and 4% wetting agent after storage of the concentrate for more than a year. Concentrations of wetting agents in excess of 6% tend to affect emulsion stability adversely. In order to ensure effective concentration of wetting agent in a treatment composition containing about 15% solids, a concentrate containing about 50% solids should also contain at least about 1% of the wetting agent before dilution. Treatment with diluted compositions resulted in rapid penetration of the asphalt emulsion compositions through the surface coal to a depth of 2.5 to 3 inches to deposit sufficient solid binder material to form a thick cohesive layer on the coal. Treatment with about 50 Imperial gallons per 500 square feet of coal surface, i.e. about 50 gallons per car, was effective to provide improved protection against wind loss during train travel.

Spraying of the surface of coal in rail cars with aqueous suspensions of asphalt emulsions or lignin products in the form of black liquor or neutralized black liquor, as hereinbefore disclosed, provides deep penetration of an effective binder at a cost which is lower than that of other proposed treatments. Asphalt emulsion binders provided an oily adhesiveness in a crust which was relatively flexible. Lumps were very slow to erode when rubbed together. Lignin in black liquor and and lignin and sugars in neutralized black liquor, both sticky when moist, contributed to effective binding. More flexible crusts and less friable blocks after cracking of the crust during rail transportation were obtained with the asphalt and lignin product binders than with the latex binders.

The binder materials entered the coal bed either in solution or as finely dispersed particles. Both rapid wetting and deep penetration were effected by use of the selected wetting agents. Rapid wetting made possible the application of 50 gallons of treatment composition per car, without runoff before penetration, as a train moved under the sprays at a minimum practical speed of ½ mile per hour. Rapid penetration of more suspension, derived from good wettability, provided a thicker crust and better protection of underlying unbonded coal. The cost of 50 gallons of 30% asphalt emulsion or black liquor concentrate (15% solids) is comparable to the cost of 50 gallons of 5% latex formulation (2.5% solids). On this basis, the costs of the asphalt formulations of Table 3 which are diluted to 7.5%, 5% and 2.5% solids are substantially less. Part of the cost of asphalt emulsions and the black liquor products is recovered in heat value derived when the coal is burned.

Since there is a tendency for the coal to settle in the cars during travel, it is advantageous to spray the coal after the train has travelled a few miles. I have found that, by using sufficient wetting agent to get maximum wettability, as disclosed, more than 50 gallons of asphalt emulsion or black liquor composition per 500 square feet of coal surface in a car can be applied without runoff. Deeper penetration and more effective binding occurs on evaporation of the water in the composition. Increasing the treatment to 75 gallons per 500 square feet of surface resulted in increasing penetration and binding to a depth of 4 to 4½ inches. With 100 gallons per 500 square feet, penetration and binding to a depth of 5 to 6 inches were observed. There was good binding of coal fines to coarser particles throughout these depths. Should delayed spraying not be practical, the application of the larger quantities at the mine site may compensate for the settling effects.

It will be understood of course that modifications can be made in the preferred embodiment of the present invention as described hereinabove without departing from the scope and purview of the appended claims.

What I claim as new and desire to protect by Letters Patent of the United States is:

1. A method of treating coal in an open top hopper car for the suppression of losses due to the action of wind on the surface of the coal while the car is in motion comprising wetting the surface of the coal with an aqueous composition containing at least about 2.5% binder material and containing 0.1 to 2.0% wetting agent to form a flexible crust on the coal, said binder material being solid material contained in an aqueous suspension of one of the group consisting of asphalt emulsion concentrates and black liquor lignin products, said wetting agent being one of the group consisting of water soluble ethoxylated alkyl phenols and sulfo succinates, said composition being formed by mixing said wetting agent and said aqueous suspension and said composition being used in a quantity of about 50 to 100 Imperial Gallons per 500 square feet of coal surface sufficient to penetrate without substantial runoff to a depth of 2.5 to 6 inches, whereby said flexible crust has an oily adhesiveness such that lumps formed on breakage of said crust are very slow to erode when rubbed together.

2. A method of treating coal as claimed in claim 1, said aqueous composition containing 2.5 to 15% said binder material.

3. A method of treating coal as claimed in claim 2, said quantity of aqueous composition being about 50 Imperial gallons per 500 square feet of coal surface and said depth of penetration being 2.5 to 3 inches.

4. A method of treating coal as claimed in claim 1, said binder material being solid material contained in an aqueous dilution of a lignin product of the group black liquor, sodium lignin sulfonate and ammonium lignin sulfonate.

5. A method of treating coal as claimed in claim 2, said binder material being solid material contained in an aqueous dilution of a lignin product of the group black liquor, sodium lignin sulfonate and ammonium lignin sulfonate.

* * * * *